United States Patent
Miller et al.

(10) Patent No.: US 11,750,119 B2
(45) Date of Patent: Sep. 5, 2023

(54) USING REGENERATIVE BRAKING TO INCREASE POWER SUPPLY HOLD-UP TIME

(71) Applicant: INTERNATIONAL BUSINESS MACHINES CORPORATION, Armonk, NY (US)

(72) Inventors: Michael Lee Miller, Rochester, MN (US); Bret P. Elison, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 17/501,064

(22) Filed: Oct. 14, 2021

(65) Prior Publication Data

US 2023/0118372 A1    Apr. 20, 2023

(51) Int. Cl.
*G06F 1/30* (2006.01)
*H02P 3/18* (2006.01)

(52) U.S. Cl.
CPC . *H02P 3/18* (2013.01); *G06F 1/30* (2013.01)

(58) Field of Classification Search
CPC ..................................... H02P 3/18; G06F 1/30
See application file for complete search history.

(56) References Cited

U.S. PATENT DOCUMENTS

| | | | | |
|---|---|---|---|---|
| 5,734,206 A * | 3/1998 | Keizer | ...................... | F24C 7/08 307/142 |
| 5,861,724 A * | 1/1999 | Ackerson | ................... | H02P 3/14 318/139 |
| 10,539,993 B2 | 1/2020 | Goodward et al. | | |
| 2011/0303000 A1 * | 12/2011 | Engstrom | ......... | G01M 17/0074 73/116.06 |
| 2013/0124117 A1 * | 5/2013 | Nomura | ................... | B60L 58/20 702/58 |
| 2013/0239913 A1 * | 9/2013 | Young | ....................... | F01P 3/18 123/41.49 |
| 2018/0267589 A1 * | 9/2018 | Goodward | ................ | G06F 1/30 |
| 2018/0272871 A1 * | 9/2018 | Takada | .................... | B60L 1/003 |

(Continued)

FOREIGN PATENT DOCUMENTS

TW          201328107 A          7/2013

OTHER PUBLICATIONS

RoboteQ, Understanding Regeneration, RoboteQ a NIDEC brand, URL: https://www.roboteq.com/applications/all-blogs/22-understanding-regeneration, printed Aug. 2, 2021, 22 pages.

(Continued)

*Primary Examiner* — Aurel Prifti
(74) *Attorney, Agent, or Firm* — Nathan M. Rau

(57) ABSTRACT

Power supply hold-up time is increased using regenerative braking. A power line disturbance ("PLD") event is detected in a power supply unit. One or more fan motors associated with the power supply unit may be signaled to provide regenerative braking based on identifying the PLD event, where the one or more fan motors transition from a motor operating mode to a regenerative braking mode. The regenerative braking may be applied to the one or more fan motors associated with the power supply unit, where a hold-up time is extended to prevent shut down of the power supply unit.

20 Claims, 8 Drawing Sheets

(56) References Cited

U.S. PATENT DOCUMENTS

2018/0361877 A1\* 12/2018 Ming .................. B60L 7/10
2020/0026336 A1    1/2020 Roy
2022/0115897 A1\* 4/2022 Ijaz .................. B60L 58/22

OTHER PUBLICATIONS

Unknown, Power Regenerating Air Moving Device, An IP.com Prior Art Database Technical Disclosure, IP.com No. IPCOM000152218D, Original Publication Date: Apr. 26, 2007, IP.Com Electronic Publication Date: Apr. 26, 2007, 4 pages.

\* cited by examiner

USING REGENERATIVE BRAKING TO INCREASE POWER SUPPLY HOLD-UP TIME

BACKGROUND

Field of the Invention

The field of the invention is data processing, or, more specifically, methods, systems, and products for increasing power supply hold-up time using regenerative braking.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

According to an embodiment of the present disclosure, a method for increasing power supply hold-up time using regenerative braking is provided. A power line disturbance ("PLD") event is detected in a power supply unit. One or more fan motors associated with the power supply unit may be signaled to provide regenerative braking based on identifying the PLD event, where the one or more fan motors transition from a motor operating mode to a regenerative braking mode. The regenerative braking may be applied to the one or more fan motors associated with the power supply unit, where a hold-up time is extended to prevent shut down of the power supply unit.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
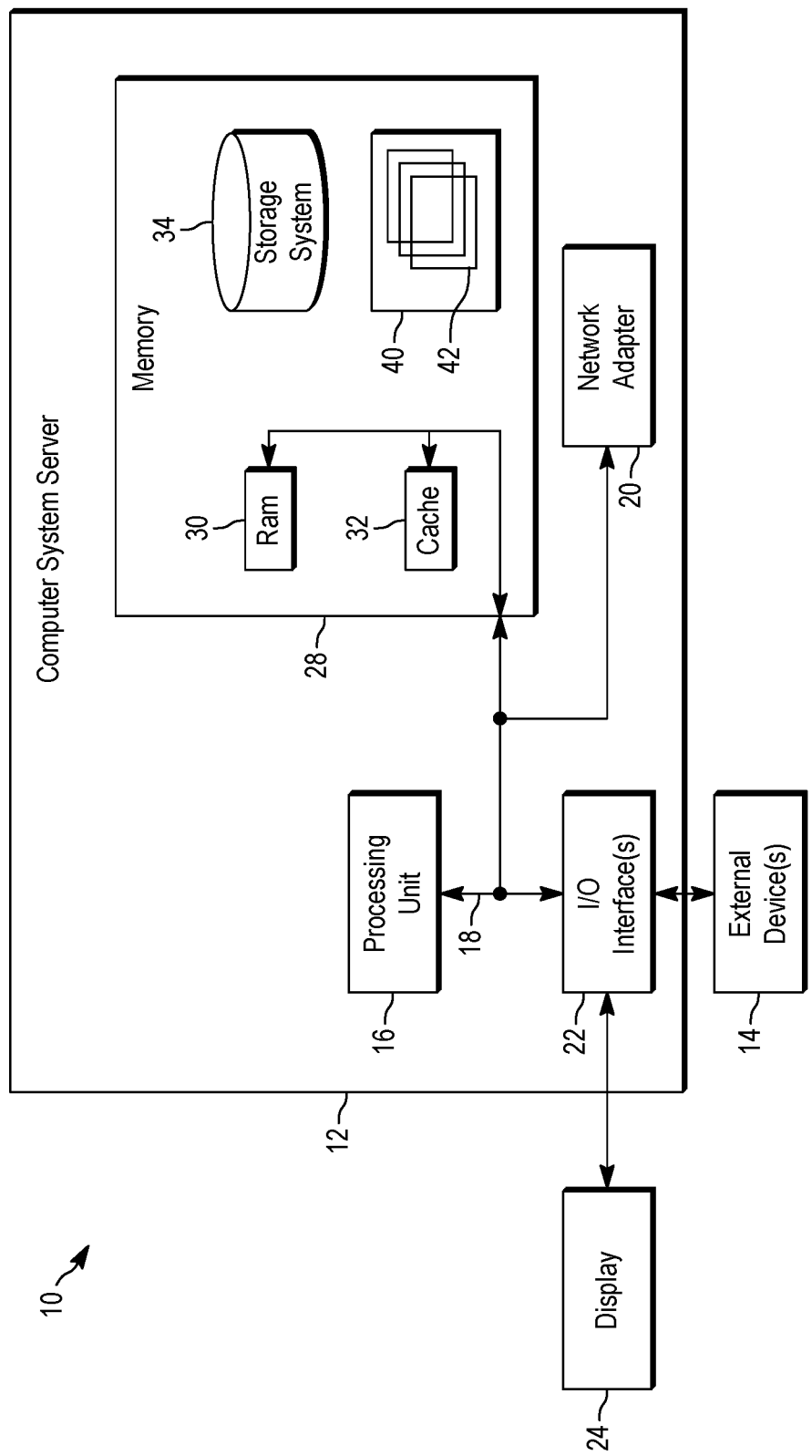
FIG. 1 is a block diagram depicting an exemplary cloud computing node according to an embodiment of the present invention.

An uninterruptible power supply (UPS), also known as an uninterruptible power source, uninterruptible power system, continuous power supply (CPS), power supply unit (PSU), or a battery backup is a device which maintains a continuous supply of electrical power to connected equipment by supplying power from a separate source when utility power is not available. A UPS differs from an auxiliary power supply or standby generator, which generally does not provide instant protection from a momentary power interruption. While not limited to safeguarding any particular type of equipment, a UPS protects computers, telecommunications equipment, and/or other electrical equipment where an unexpected power disruption could cause injuries, business disruption, or data loss. UPS units range in size from units that will back up a single computer to units that will power entire data centers or buildings.

Power Supplies (PSUs) are specified to meet alternating current (AC) outages or Power Line Disturbances (PLD) of varying duration and dip. A PLD is a transient or temporary fluctuation in power supplied over a power line to an electronic device. While a PLD may cause a fluctuation in the power provided to a data processing device, in general, the PLD is a recoverable event (e.g., it is not a power loss event that requires the shutting down of the data processing system). The PLD durations can vary from 10 milliseconds (ms) to 2 seconds, and disturbance from −20% to −100% of nominal AC voltage.

Surviving and reducing power line disturbances (PLD) is critical to system availability. Thus, some computing system specifications for PLD events are more stringent than other systems. In some geographical regions, PLD specification requirements vary. For example, a 10 ms (−100%) PLD is legally required to be bought or sold into certain countries. To meet these PLD specifications, a PSU requires large high-voltage capacitors for hold-up times that allows the PSU to ride through the AC outage. These capacitors are increasingly a larger proportion of the internal PSU volume, block airflow as their height is typically a full chassis height, and therefore it is desirable to reduce their size and/or number. Reducing capacitor size also reduces PSU volumetric density and cost.

Accordingly, an embodiment is directed to a method of increasing power supply hold-up time using regenerative braking in a computing system. The method includes identifying a power line disturbance ("PLD") event in a power supply unit. The method includes signaling one or more fan motors associated with the power supply unit to provide regenerative braking based on identifying the PLD event, where the one or more fan motors transition from a motor operating mode to a regenerative braking mode. The method includes applying the regenerative braking to the one or more fan motors associated with the power supply unit, where a hold-up time is extended to prevent shut down of the power supply unit.

In some implementations, the identifying the PLD event further includes detecting a current signal is less than a power supply unit shutdown thresholds. More specifically, the identifying the PLD event may be identified based on the current (AC input current) falling below a power supply unit shutdown threshold and remaining under the power supply unit shutdown threshold for at least a defined or selected period of time. For example, the PLD event may be identified based on the current (AC input current) falling below a power supply unit shutdown threshold and remaining under the power supply unit shutdown threshold for at least one millisecond.

In some implementations, the method also includes determining a number of the one or more fan motors to transition from the operating mode to a regenerative braking mode based on load requirements for the power supply unit. In some implementations, applying the regenerative braking by the one or more fan motors to the power supply unit further includes applying the regenerative braking by the one or more fan motors in conjunction with one or more capacitors of the power supply unit to provide hold-up energy to extend the hold-up time to prevent shut down. In some implementations, the method also includes sending power collected from the one or more fan motors, while operating in the regenerative braking mode, to a 12-volt power bus connected to a system load associated with the power supply unit.

In some implementations, the method also includes detecting an alternating current signal is greater than a power supply unit shutdown threshold while applying the regenerative braking by the one or more fan motors to the power supply unit. More specifically, the method may identify PLD event is completed or terminated by identifying the alternating current signal is greater than a power supply unit shutdown threshold. Thus, the PLD event may be identified as completed or terminated by 1) identifying the alternating current signal is greater than a power supply unit shutdown threshold, 2) identifying the alternating current signal is greater than a power supply unit shutdown threshold, and 3) identifying the alternating current signal is greater than a power supply unit shutdown threshold for at least a defined or selected period of time. For example, the PLD event may be identified as completed or terminated based on the current (AC input current) rising above a power supply unit shutdown threshold and remaining under the power supply unit shutdown threshold for at least one millisecond. In some implementations, the method also includes signaling the one or more fan motors to transition from the regenerative braking mode back to the motor operating mode.

Another embodiment is directed to a system for increasing power supply hold-up time using regenerative braking in a computing system. The system comprises a computer processor, a computer memory operatively coupled to the computer processor, the computer memory having disposed therein computer program instructions that, when executed by the computer processor, cause the system to identify a power line disturbance ("PLD") event in a power supply unit. The computer program instructions also, when executed, cause the system to signal one or more fan motors associated with the power supply unit to provide regenerative braking based on identifying the PLD event, where the one or more fan motors transition from a motor operating mode to a regenerative braking mode. The computer program instructions also, when executed, cause the system to apply the regenerative braking to the one or more fan motors associated with the power supply unit, where a hold-up time is extended to prevent shut down of the power supply unit.

In some implementations, the identifying the PLD event further includes detecting a current signal is less than a power supply unit shutdown thresholds. In some implementations, the computer program instructions also, when executed, cause the system to determine a number of the one or more fan motors to transition from the operating mode to a regenerative braking mode based on load requirements for the power supply unit.

In some implementations, applying the regenerative braking by the one or more fan motors to the power supply unit further includes applying the regenerative braking by the one or more fan motors in conjunction with one or more capacitors of the power supply unit to provide hold-up energy to extend the hold-up time to prevent shut down. In some implementations, the computer program instructions also, when executed, cause the system to transfer, send, or redirect power collected from the one or more fan motors, while operating in the regenerative braking mode, to a 12-volt power bus connected to a system load associated with the power supply unit.

In some implementations, the computer program instructions also, when executed, cause the system to detect an alternating current signal is greater than a power supply unit shutdown threshold while applying the regenerative braking by the one or more fan motors to the power supply unit. More specifically, the method may identify PLD event is completed or terminated by identifying the alternating current signal is greater than a power supply unit shutdown threshold. Thus, the PLD event may be identified as completed or terminated by 1) identifying the alternating current signal is greater than a power supply unit shutdown threshold, 2) identifying the alternating current signal is greater than a power supply unit shutdown threshold, and 3) identifying the alternating current signal is greater than a power supply unit shutdown threshold for at least a defined or selected period of time. For example, the PLD event may be identified as completed or terminated based on the current (AC input current) rising above a power supply unit shutdown threshold and remaining under the power supply unit shutdown threshold for at least one millisecond. In some implementations, the method also includes signaling the one or more fan motors to transition from the regenerative braking mode back to the motor operating mode. In some implementations, the computer program instructions also, when executed, cause the system to signal the one or more fan motors to transition from the regenerative braking mode back to the motor operating mode.

Yet another embodiment is directed to a computer program product for increasing power supply hold-up time using regenerative braking in a computing system. The computer program product is disposed upon a computer readable medium and comprises computer program instructions that, when executed, cause a computer to identify a power line disturbance ("PLD") event in a power supply unit. The computer program instructions also cause the computer to signal one or more fan motors associated with the power supply unit to provide regenerative braking based on identifying the PLD event, where the one or more fan motors transition from a motor operating mode to a regenerative braking mode. The computer program instructions also cause the computer to apply the regenerative braking to the one or more fan motors associated with the power supply unit, where a hold-up time is extended to prevent shut down of the power supply unit.

In some implementations, the identifying the PLD event further includes detecting a current signal is less than a power supply unit shutdown thresholds. In some implementations, the computer program instructions also, when executed, cause the computer to determine a number of the one or more fan motors to transition from the operating mode to a regenerative braking mode based on load requirements for the power supply unit.

In some implementations, applying the regenerative braking by the one or more fan motors to the power supply unit further includes applying the regenerative braking by the one or more fan motors in conjunction with one or more capacitors of the power supply unit to provide hold-up energy to extend the hold-up time to prevent shut down. In some implementations, the computer program instructions also, when executed, cause the computer to transfer, send, or redirect power collected from the one or more fan motors, while operating in the regenerative braking mode, to a 12-volt power bus connected to a system load associated with the power supply unit.

In some implementations, the computer program instructions also, when executed, cause the computer to detect an alternating current signal is greater than a power supply unit shutdown threshold while applying the regenerative braking by the one or more fan motors to the power supply unit. More specifically, the method may identify PLD event is completed or terminated by identifying the alternating current signal is greater than a power supply unit shutdown threshold. Thus, the PLD event may be identified as completed or terminated by 1) identifying the alternating current signal is greater than a power supply unit shutdown threshold, 2) identifying the alternating current signal is greater than a power supply unit shutdown threshold, and 3) identifying the alternating current signal is greater than a power supply unit shutdown threshold for at least a defined or selected period of time. For example, the PLD event may be identified as completed or terminated based on the current (AC input current) rising above a power supply unit shutdown threshold and remaining under the power supply unit shutdown threshold for at least one millisecond. In some implementations, the method also includes signaling the one or more fan motors to transition from the regenerative braking mode back to the motor operating mode. In some implementations, the computer program instructions also, when executed, cause the computer to signal the one or more fan motors to transition from the regenerative braking mode back to the motor operating mode.

In general, as used herein, "enhance" or "improve" may refer to or be defined as "maximize," "minimize," "best," or attain one or more specific targets, objectives, goals, or intentions. Enhance or improve may also refer to maximizing a benefit to a user (e.g., maximize a trained machine learning pipeline/model benefit). Enhance or improve may also refer to making the most effective or functional use of a situation, opportunity, or resource.

Additionally, enhancing or improving need not refer to a best solution or result but may refer to a solution or result that "is good enough" for a particular application, for example. In some implementations, an objective is to suggest a "best" combination of identifying timing flow of a circuit path and adjusting one or more parameters or components of the critical path and/or design model, but there may be a variety of factors that may result in alternate suggestion of a combination of operations or adjustments. Herein, the terms "enhance" or "improve" may refer to such results based on minima (or maxima, depending on what parameters are considered in the optimization problem). In an additional aspect, the terms "enhancing" and "improving" may refer to an operation performed in order to achieve an improved result such as reduced execution costs or increased resource utilization, whether or not the optimum result is actually achieved. Similarly, the terms "enhance" or "improve" may refer to a component for performing such an improvement operation, and the term terms "enhance" may be used to describe the result of such an improvement or adjustment operation.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and performing any of the functionality set forth hereinabove.

In cloud computing node 10 there is a computer system/server 12, which is operational with numerous other general purpose or special purpose computing system environments or configurations. Examples of well-known computing systems, environments, and configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory ("RAM") 30 and cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the disclosure.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and a public network (e.g., the Internet) via network adapter 20. As depicted, network adapter 20 communicates with the other components of computer system/server 12 via bus 18. It should be understood that although not shown, other hardware and software components could be used in conjunction with computer system/server 12. Examples, include, but are not limited to: microcode, device drivers, redundant processing units, external disk drive arrays, RAID systems, tape drives, and data archival storage systems, etc.

Figure 2:
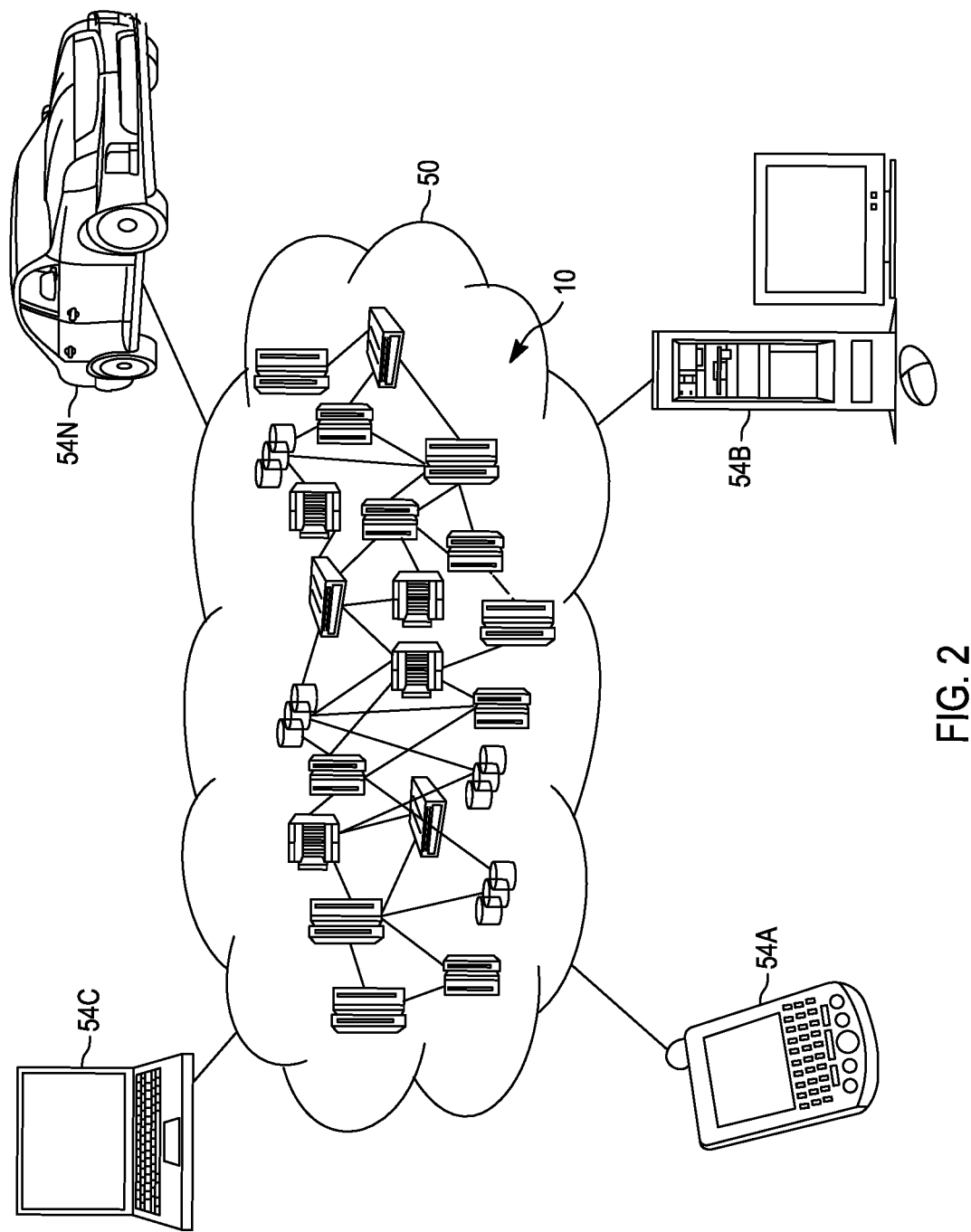
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and network addressable connection (e.g., using a web browser).

Figure 3:
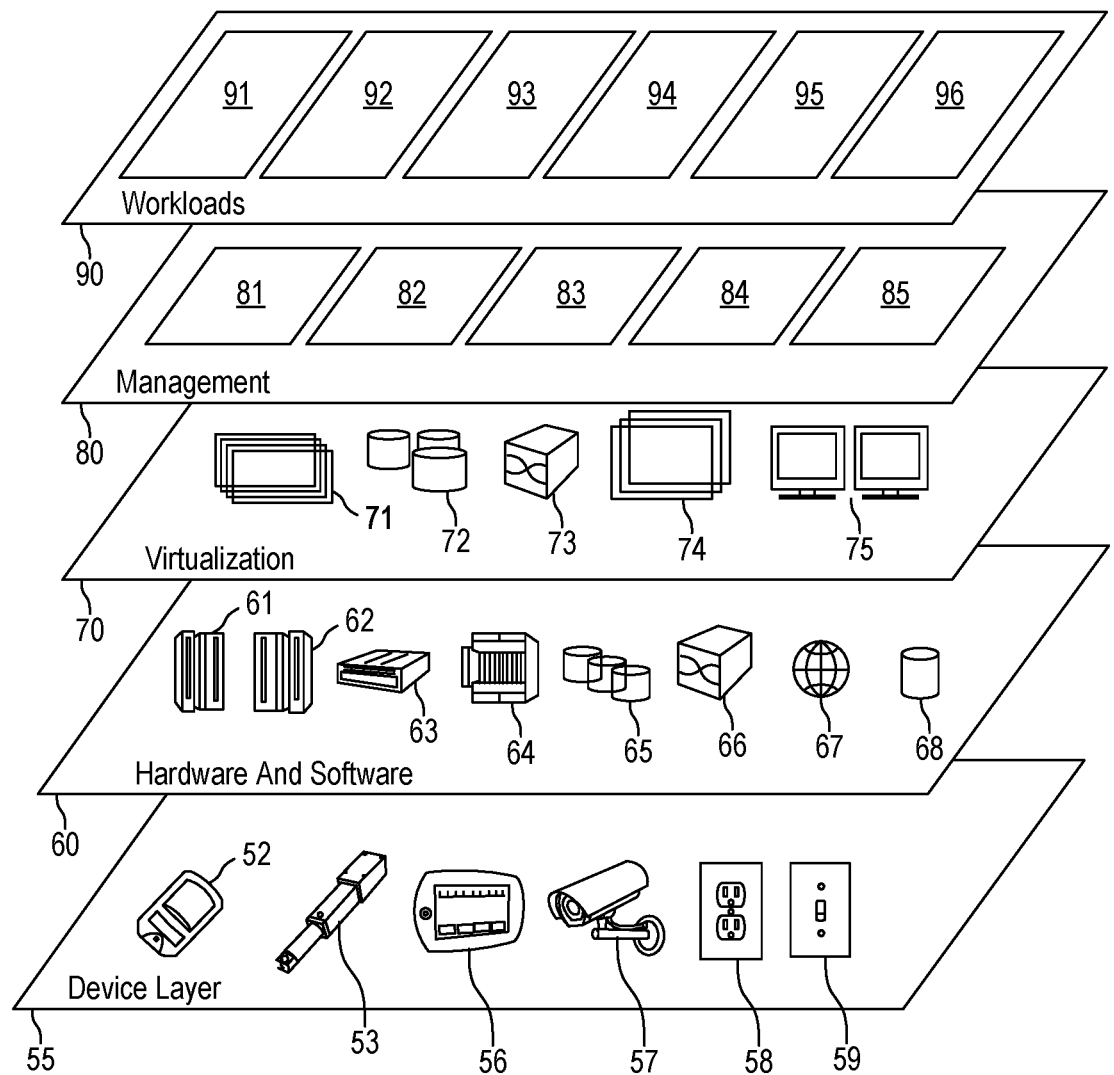
FIG. 3 depicts abstraction model layers according to an embodiment of the present invention.

Referring now to FIG. 3, a set of functional abstraction layers provided by cloud computing environment 50 (FIG. 2) is shown. It should be understood that the components, layers, and functions shown in FIG. 3 are intended to be illustrative only and embodiments of the disclosure are not limited thereto. As depicted, the following layers and corresponding functions are provided:

Device layer 55 may include physical devices, virtual devices, or a combination of physical and virtual devices embedded with standalone electronics, sensors, actuators, and other objects to perform various tasks in a cloud computing environment 50. Each of the devices in the device layer 55 incorporates networking capability to other functional abstraction layers such that information obtained from the devices may be provided thereto, and information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present disclosure, various workloads and functions 96 for increasing power supply hold-up time using regenerative braking in a computing environment. In addition, workloads and functions 96 for increasing power supply hold-up time using regenerative braking may include such operations as analytics, metadata collect, and critical path identification, and as will be further described, user and device management functions. One of ordinary skill in the art will appreciate that the workloads and functions 96 for increasing power supply hold-up time using regenerative braking may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present disclosure.

As previously stated, various embodiments described herein provide novel solutions for increasing power supply hold-up time using regenerative braking. A power line disturbance ("PLD") event is detected in a power supply unit. One or more fan motors associated with the power supply unit may be signaled to provide regenerative braking based on identifying the PLD event, where the one or more fan motors transition from a motor operating mode to a regenerative braking mode. The regenerative braking may be applied to the one or more fan motors associated with the power supply unit, where a hold-up time is extended to prevent shut down of the power supply unit.

Figure 4:
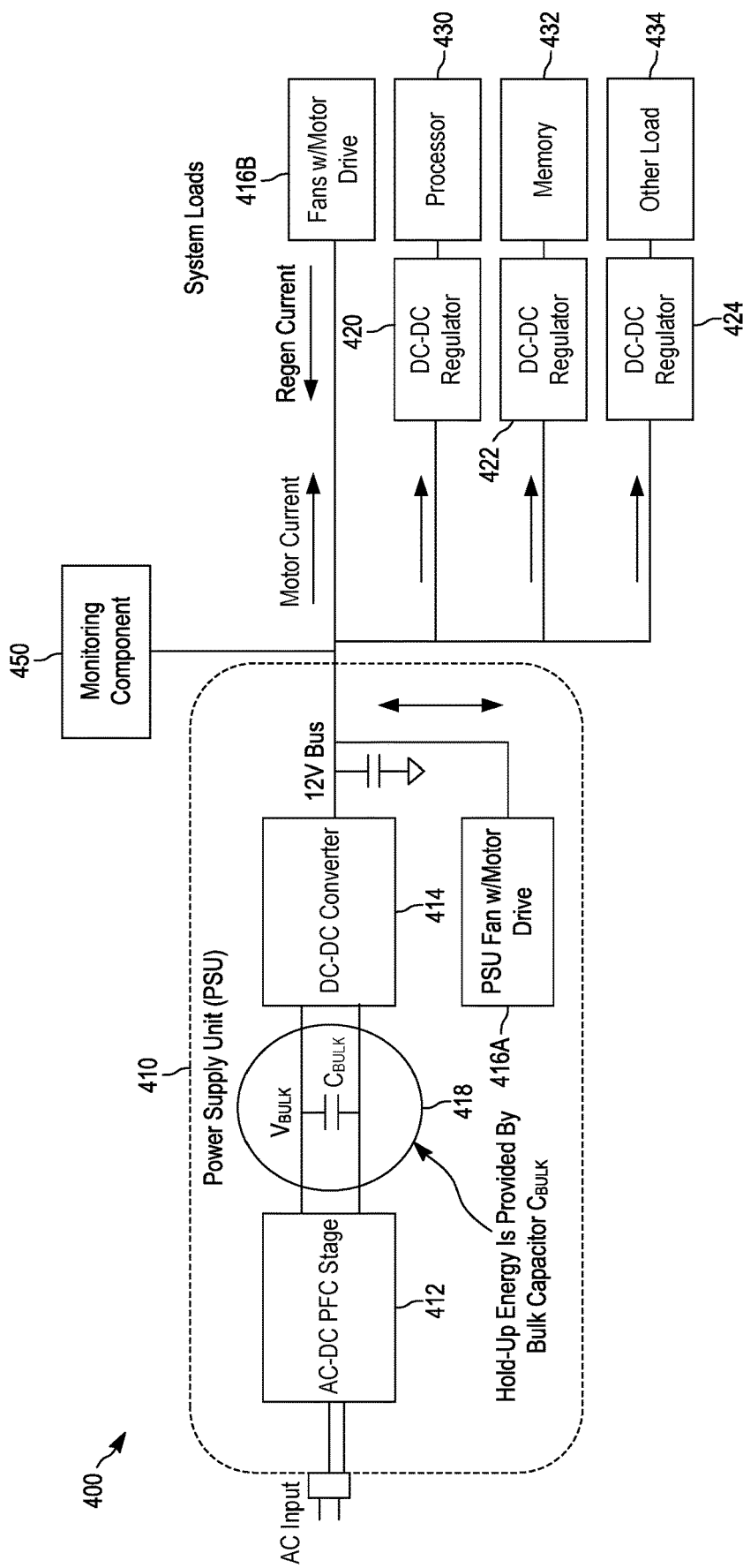
FIG. 4 is a block diagram of a power supply unit in a system according to some implementations of the present disclosure.

Turning now to FIG. 4, a block diagram depicting exemplary functional components of a power supply unit system 400 for improving processor chip timing adjustment in an electronic design automation ("EDA") environment is shown. In one aspect, one or more of the components, modules, services, applications, and functions described in FIGS. 1-3 may be used in FIG. 4. As will be seen, many of the functional blocks may also be considered "modules" or "components" of functionality, in the same descriptive sense as has been previously described in FIGS. 1-3.

A power supply unit (PSU) 410 is shown, incorporating a power stage component 412 (e.g., an alternating current/direct current (AC-DC) power factor correction (PFC) stage component for receiving an alternating-current input from an external power supply. The power stage component may assist with controls the power delivered from the external power supply and switches an internal switch on and off for a particular duty cycle such that the stage output voltage Vout is maintained at or near a particular reference voltage across capacitor 418. The PSU 410 may include the capacitor 418 also connected to converter 414 (e.g., DC-DC converter) for converting to a predetermined direct-current power supply voltage and for supplying direct-current output to an information processing unit (e.g., processor 430). The PSU 410 may include PSU fan 414A with a motor driver, and a 12-volt (V) bus line.

The PSU 410 may be connected to a monitoring component and one or more system loads such as, for example, one or more regulators such as, for example, DC-DC regulators 420, 422, and 424, a processor 430, a memory 432, one or more fans 416B with motor drives (e.g., system fans external to the PSU 410), and other various types of loads 434. The PSU fans 416A may be generating a motor current via the 12V bus power line that may be sent to the various system loads.

The processor 430 may perform various computational, data processing and other functionality in accordance with various aspects of the present disclosure. In one aspect, the processor 430, memory 432, and the monitoring component 450 may be internal and external to the PSU 410, and internal and external to the computing system/server 12 as described in FIG. 1. The PSU 410 may be included and external to the computer system/server 12, as described in FIG. 1. The processing unit 430 may be in communication with the memory 432 and the monitoring component 450.

In operation, the monitoring component, in association with processor 430, may identify a power line disturbance ("PLD") event in PSU 410. During the PLD event, capacitors 418 (e.g., bulk capacitors) located in the PSU 410 will provide hold-up energy to enable the system 400 to endure the PLD event without shutting down, faulting, or causing a system fault code.

The amount of energy stored in the bulk capacitor is depicted in equation 1:

$$E_{cap} = \frac{1}{2} * C_{BULK} * V_{BULK}^2, \quad (1)$$

which may be substantially 103 joules (J) of energy for a single PSU 410, where E is the energy, C is the capacitance and V is the voltage, and $C_{BULK}$ is the bulk capacitance of the bulk capacitors. For a motor, the rotational kinetic energy ($KE_{ROT}$) is depicted in equation 2:

$$KE_{ROT} = \frac{1}{2} * I_{FAN} * W^2, \quad (2),$$

which may be substantially (9.33/21.0 J at 8 k/12 k revolutions per minute (RPM) for the fan 416A, where $I_{FAN}$ is a moment of inertia for fan, and W is the angular velocity. Regenerative power ($P_R$) available as depicted in equation 3:

$$P_R = \text{number of fans} * \text{number of rotars} * \frac{KE_{ROT}}{t_{PLD}} \text{ watts}, \quad (3)$$

where $t_{PLD}$ is the total duration of a PLD event. It should be noted that a bulk capacitor ($C_{BULK}$) is a capacitor that is used to prevent the output of a supply from dropping too far during the periods when current is not available. The voltage bulk ($V_{BULK}$) may represent the incoming voltage (from an external source) to the power supply unit.

It should be noted that higher currents that need to extract the rotational energy in a short amount of time cause higher copper loss ($I^2R$) losses, so the overall conversion efficiency can be lower for a fan motor operating in generator mode as compared on motor mode where the motor is propelling and rotating the fans as in the ordinary course of operation such as, for example, rotating the fans to cool a computing system. It should be noted that a copper loss is the energy dissipation that takes place due to resistance of windings and is due to magnetic effects primarily attributed to a core. Also, regenerative braking is less effective as the motor spins down as it is proportional to velocity squared, however most of the energy can be extracted before the fan spins down too low.

Having detected the PLD event in the power supply unit 410 by the monitoring component 450, one or more fan motors such as, for example, fans 416A, 416B associated with the power supply unit 410 may be signaled to provide regenerative braking based on identifying the PLD event. The signal may be issued by the monitoring component 450 to the fan motors such as, for example, fans 416A, 416B. Upon receipt of the triggering signal, one or more fan motors such as, for example, fans 416A, 416B transition from a motor operating mode to a regenerative braking mode.

The regenerative power provided by and/or collected from the one or more fan motors such as, for example, fans 416A, 416B, while operating in the regenerative braking mode, may be transferred/sent to the 12V power bus connected to a system load associated with the power supply unit 410. For example, both fans 416A, internal to the PSU 410, and fans 416B, external to the PSU 410, may provide a regeneration current (regen current) on the 12V power bus to assist the capacitors 418 and extend the hold-up time preventing shut down of the power supply unit 410. The regenerative braking executed by the one or more fan motors such as, for example, fans 416A, 416B assist the bulk capacitors 418 to extend the hold-up time to prevent shut down of the power supply unit 410.

For example, a system load, not including the fans 416B, may require 4000 watts (W) of power. The system fan (e.g., fans 416A, 416B), which may be five 60-millimeter (mm) fans with dual rotors) may require 250 W of power at a minimum fan speed (e.g., less than or equal to 8 thousand (k) RPM) or 500 W of power at a maximum fan speed (e.g., greater than or equal to 12 k RPM). Thus, the regenerative power ($P_R$) provided by the fans, for a 100 ms PLD event (assuming 30% overall conversion efficiency), may depict 280 W of energy for minimum fan speed and 630 W of energy for the maximum fan speed. The total power savings during the PLD event may be 580 W (15% of system load) for the minimum fan speed and 1250 W (e.g., 31% of system load) of energy for the maximum fan speed.

Figure 5:
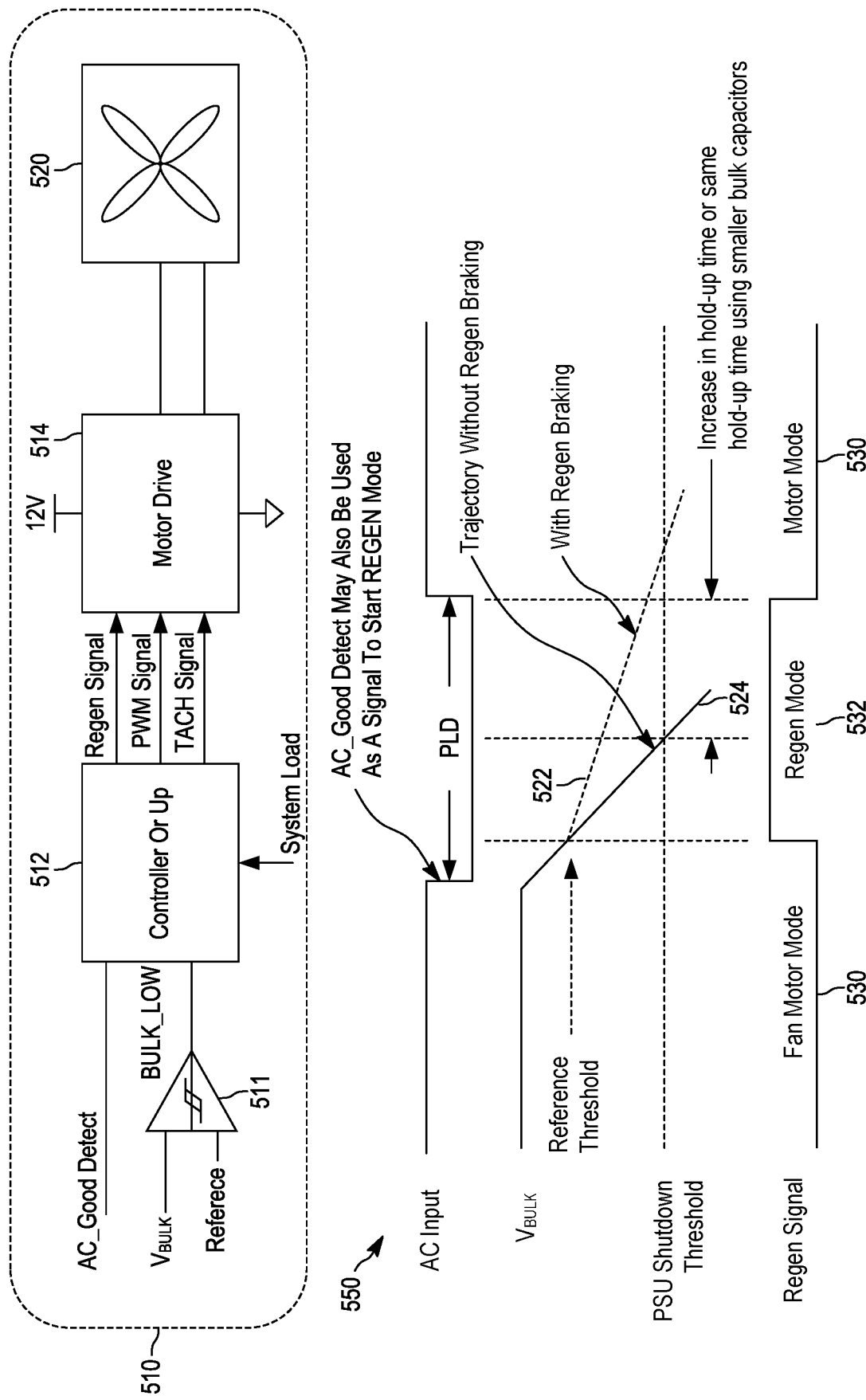
FIG. 5 is a block diagram of a power supply unit in a system according to some implementations of the present disclosure.

For further explanation, FIG. 5 is a block diagram of a system 500 according to some implementations of the present disclosure. As will be seen, many of the functional blocks may also be considered "modules" or "components" of functionality, in the same descriptive sense as has been previously described in FIGS. 1-4. With the foregoing in mind, the module/component of FIG. 5 may also be incorporated into various hardware and software components of a system in accordance with the present invention. Repetitive description of like elements, components, modules, services, applications, and/or functions employed in other embodiments described herein is omitted for sake of brevity.

In some implementations, the system 500 depicts, by way of example only, a circuit 510 is depicted for regenerative braking such as, for example, a circuit of a power supply unit such as, for example, the power supply unit 410 of FIG. 4. In some implementations, the circuit 510 may include an AC current that is input into a controller 512, which may also be included in the circuit 510. In one aspect, the controller 512 may include the monitoring component 450 of FIG. 4. In other implementations, the controller may receive one or more signals to perform one or more actions as described herein (e.g., for sending a regen signal, PWM signal (e.g., a signal to reduce average power delivered by an electrical signal, by effectively chopping it up into discrete parts), and/or a tach signal).

The circuit may include one or more amplifiers 511 having input line $V_{BULK}$ and a reference voltage applied at input terminals of the amplifiers. The one or more amplifiers 511 may generate a low $V_{BULK}$ based on the reference voltage that is then sent to the controller 512. The controller 512 may produce an output signals such as, for example, a regeneration (regen) signal, a PWM signal, and a tach signal. In one aspect, the tach signal is a tachometer signal that indicates/measures rotational speed of a shaft or disk (e.g., fan motors) and indicates how fast or the speed of the fan motors. The tach signal may be used to provide RPM information of the fans 520.

The circuit 510 may include a motor drive 514, associated with one or more motor fans 520, connected to the controller 512 for receiving the output signals. It should be noted that circuit 510 may include one or more additional components and architectural schematics.

FIG. 5 also depicts a graph diagram 550 showing an AC input signal, the $V_{BULK}$, a PSU shutdown threshold signal, and a regen signal as it relates to operations of the circuit 510. That is, in operation, in an operational motor mode, full-bridge field-effect transistors (FETs" are controlled in a known pulse-width modulator (PWM) manner to vary the voltage to the motor 514 of the fans 520 and control RPM. During a PLD, the motor 514 may change operation modes from an "motor operation mode" into a regenerative mode where full-bridge FETs are held "ON" or "OFF" to direct the current back into the 12V bus.

The system load associated with the motor 514 is reduced by two factors. The first factor is the load of the fan 520 itself. The second factor is the energy harvested from the rotational inertia of the fan rotors of the fan 520 as they are turned off. This savings in load power can be used to increase the hold-up time or to reduce the size, capacitance, and volume, of the bulk capacitors. In some implementations, monitoring the AC line may performed for control, but is slower since it may take longer than 10-20 ms to detect and assert an appropriate AC signal (AC_GOOD) signal indicating a PLD event as compared to an AC signal glitch or AC signal anomaly. In some implementation, the AC_GOOD signal is more useful for longer duration PLD events.

For further explanation, assume circuit 510 is operating where the motor drive 514 are in motor operational mode. With reference now to graph 550, the AC input signal may be monitored. After a period of time, an AC_GOOD signal is detected (e.g., AC signal is determined to have an PLD event occurring), and the PLD event is detected (e.g., the AC signal is detected to be at or below the threshold for at least 1 millisecond). The motor 514 receives the regen signal from the controller 512 indicating the requirement to change from the motor operational mode to the regenerative braking mode. The regenerative braking is applied to the one or more fan motors 520 by the motor 514. The regenerative braking applied to the fan motors 520 generates a hold up energy and extends the hold-up energy of the motor 514 to prevent shut down of a power supply unit.

As depicted in graph 550, the regen signal depicts the motor drive 514 operating in a fan motor mode 530. At the point in time of detecting the PLD event by the AC input, the regen signal changes to "regen mode" 532 indicating the motor drive 514 is operating in the regenerative braking mode.

Also, graph 550 depicts a comparison a trajectory between the $V_{BULK}$ operating without regenerative braking (e.g., a $V_{BULK}$ "reference signal" 524 represented as the solid line of graph 550) as compared to operating with regenerative braking (e.g., $V_{BULK}$ 522 shown as a dashed line). By applying the regenerative braking to the motor drive 514 the fans extend and increase the hold-up time or equivalent hold-up time using smaller bulk capacitors.

The PSU shutdown signal may be used such that if the AC input signal falls below the PSU shutdown signal (e.g., the AC signal is detected to at or below the threshold for a defined or selected period of time such as, for example, the AC signal being below the threshold for at least 1 milliseconds), the controller 512 may send the regen signal to the motor drive 514 of the fans 520 providing instruction to transition from the motor operation mode to the regenerative braking mode and apply regenerative braking to the fan 520.

In contrast, if the AC input signal increases above the PSU shutdown signal (e.g., the AC signal is above the threshold for at least 1 millisecond), the controller 512 may send the regen signal to the motor drive 514 of the fans 520 providing instruction to transition from the regenerative braking mode back to the motor mode and disengage regenerative braking on the fan 520. That is, the PLD event is identified as being completed or terminated by identifying the alternating current signal is greater than a power supply unit shutdown threshold. For example, the PLD event may be identified as completed or terminated by 1) identifying the AC input signal is greater than a power supply unit shutdown threshold, 2) identifying the AC input signal is greater than a power supply unit shutdown threshold, and 3) identifying the AC input signal is greater than a power supply unit shutdown threshold for at least a defined or selected period of time. For example, the PLD event may be identified as completed or terminated based on the AC input signal rising above a power supply unit shutdown threshold and remaining under the power supply unit shutdown threshold for at least one millisecond. Thus, the controller 512 may send the regen signal to the motor drive 514 of the fans 520 providing instruction to transition from the regenerative braking mode back to the motor operation mode and disengage regenerative braking on the fan 520.

Figure 6:
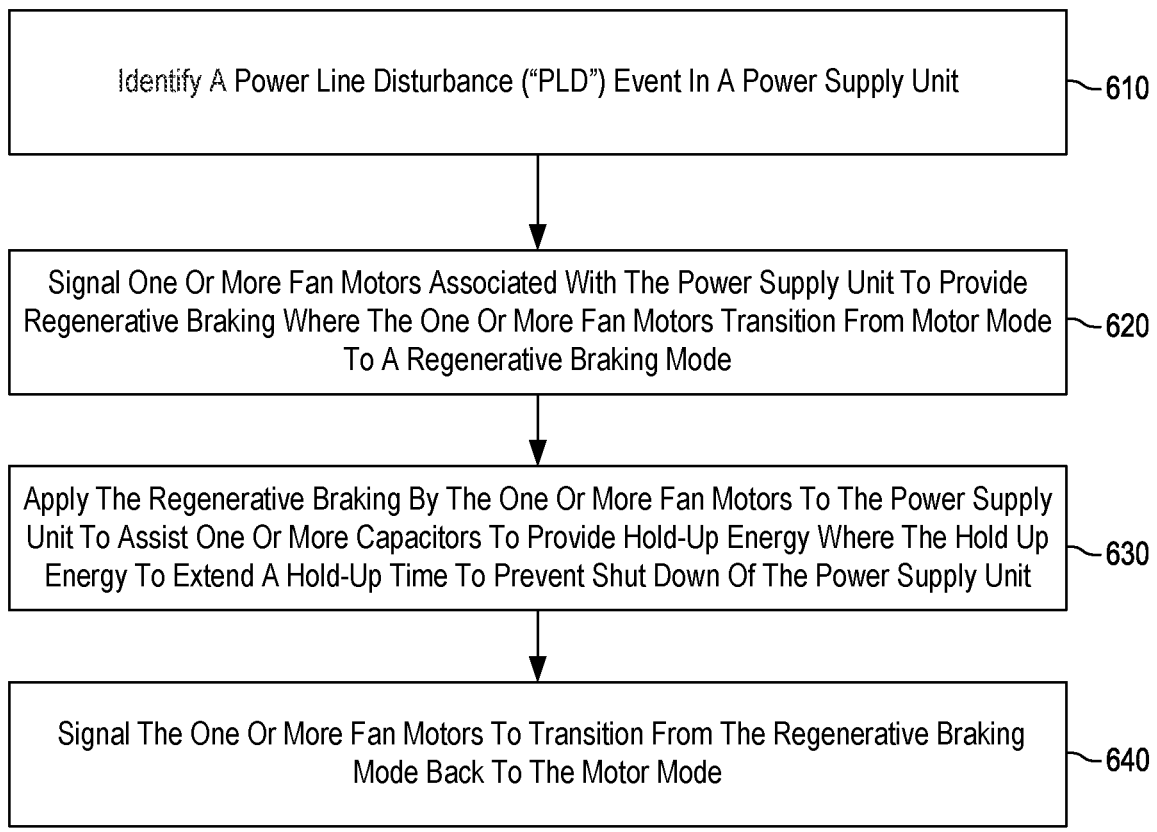
FIG. 6 is a block diagram of a power supply unit in a system according to some implementations of the present disclosure.

For further explanation, FIG. 6 sets forth a flow chart illustrating an example method of improving processor chip timing adjustment in accordance with some embodiments of the present disclosure. The example method of FIG. 6 includes identifying 610 a power line disturbance (PLD) event in a power supply unit. Identifying the power line disturbance (PLD) event in a power supply unit can be carried out by identifying an AC input signal into a power supply unit falls below a power supply unit threshold. Also, the AC input signal may be designated as a "good signal" meaning the AC input signal has been monitored and determined the AC input signal is performing as expected and is not a glitch or anomaly. Also, the The example method of FIG. 6 includes signaling 620 one or more fan motors associated with the power supply unit to provide regenerative braking where the one or more fan motors transition from motor mode to a regenerative braking mode. Signaling one or more fan motors associated with the power supply unit to provide regenerative braking can be carried out by sending a regen signal from a monitoring component to a fan motor. The regen signal indicates to the fan motor to transition from a motor operation mode to a regenerative braking mode. The signal may be generated and distributed to the fan motor by the monitoring component based upon identifying the PLD event.

The example method of FIG. 6 includes applying 630 the regenerative braking by the one or more fan motors to the power supply unit to assist one or more capacitors to provide hold-up energy where the hold-up energy to extend a hold-up time to prevent shut down of the power supply unit. Applying the regenerative braking by the one or more fan motors to the power supply unit can be carried out by signaling one or more components of the fan motor by turning kinetic energy of the fan into electricity. The regenerative braking mode applies regenerative braking to the fan motors, slowing the fans down, and converts the rotational kinetic energy ($KE_{ROT}$) of the fans to regenerative power ($P_R$). The regenerative power ($P_R$) is then transferred by the fan motor to a power bus line (e.g., a 12V bus) for assisting bulk capacitors in extending the hold-up time to prevent shut down of the power supply unit.

The example method of FIG. 6 includes signaling 640 the one or more fan motors to transition from the regenerative braking mode back to the motor mode. Signaling the one or more fan motors to transition from the regenerative braking mode back to the motor mode can be carried out by 1) detecting the AC input current signal is greater than a power supply unit shutdown threshold, and then 2) signaling one or more fan motors associated with the power supply unit to transition from operating in the regenerative braking mode back to the motor operation mode. The signal may be a new regen signal from a monitoring component to a fan motor. Alternatively, the regen signal may be terminated indicating to the fan motor to transition from the regenerative braking mode back to the motor operation mode.

Figure 7:
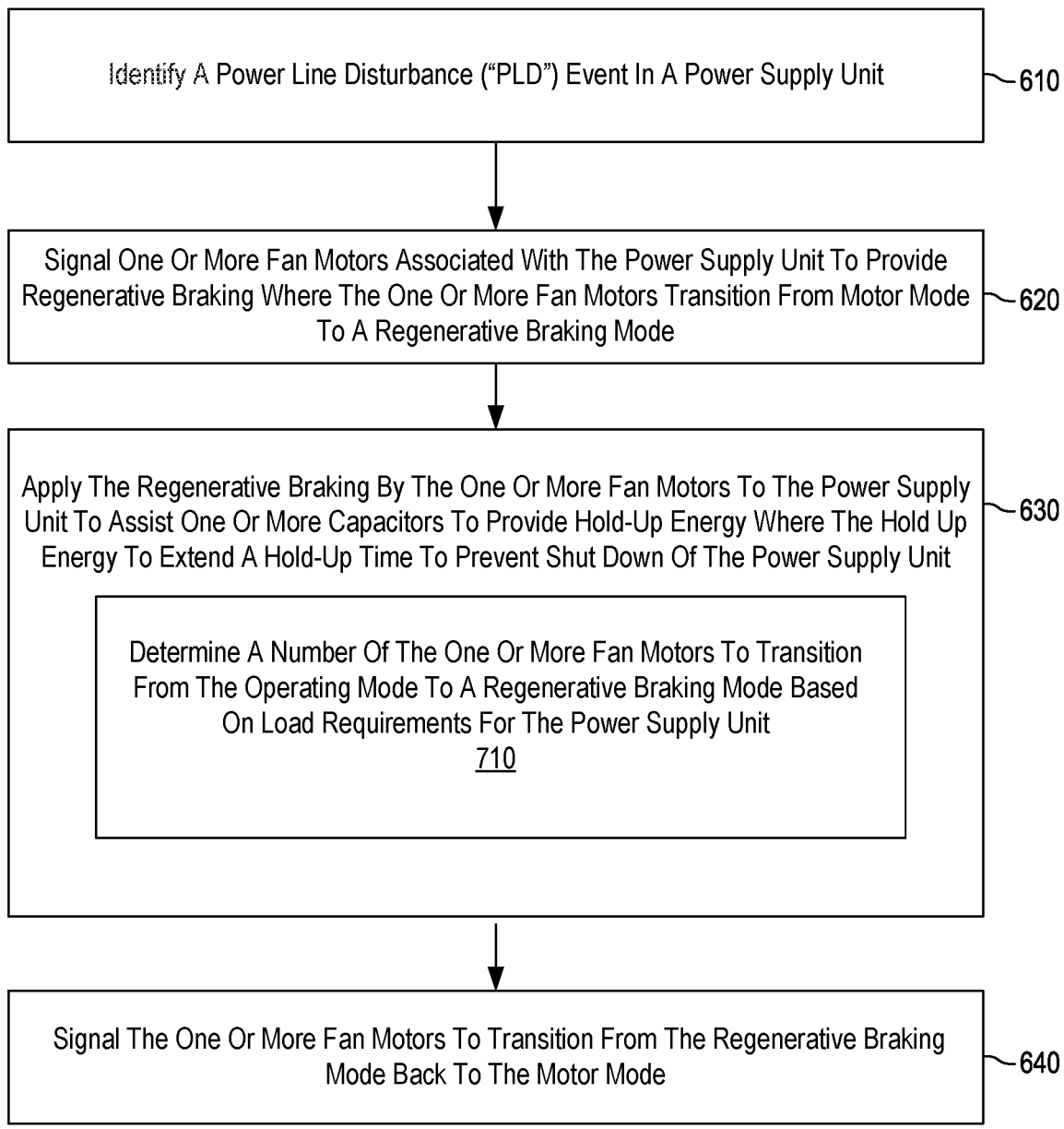
FIG. 7 is a flowchart of an example method for increasing power supply hold-up time using regenerative braking according to some implementations of the present disclosure.

For further explanation, FIG. 7 is a flowchart of an example method for increasing power supply hold-up time using regenerative braking according to some implementations of the present disclosure. Like the example method of FIG. 6, the example method of FIG. 7 includes identifying 610 a power line disturbance (PLD) event in a power supply units; signaling 620 one or more fan motors associated with the power supply unit to provide regenerative braking where the one or more fan motors transition from motor mode to a regenerative braking mode; applying 630 the regenerative braking by the one or more fan motors to the power supply unit to assist one or more capacitors to provide hold-up energy where the hold-up energy to extend a hold-up time to prevent shut down of the power supply unit; and signaling 640 the one or more fan motors to transition from the regenerative braking mode back to the motor mode.

The example method of FIG. 7 also includes determining 710 a number of the one or more fan motors to transition from the operating mode to a regenerative braking mode based on load requirements for the power supply unit. Determining a number of the one or more fan motors to transition from the operating mode to a regenerative braking mode by determining a number of active motor fans engaged in a motor operation mode. The monitoring component 450 may monitor and determining each fan motor internal and external to the power supply unit that are engaged in a motor operation mode.

Figure 8:
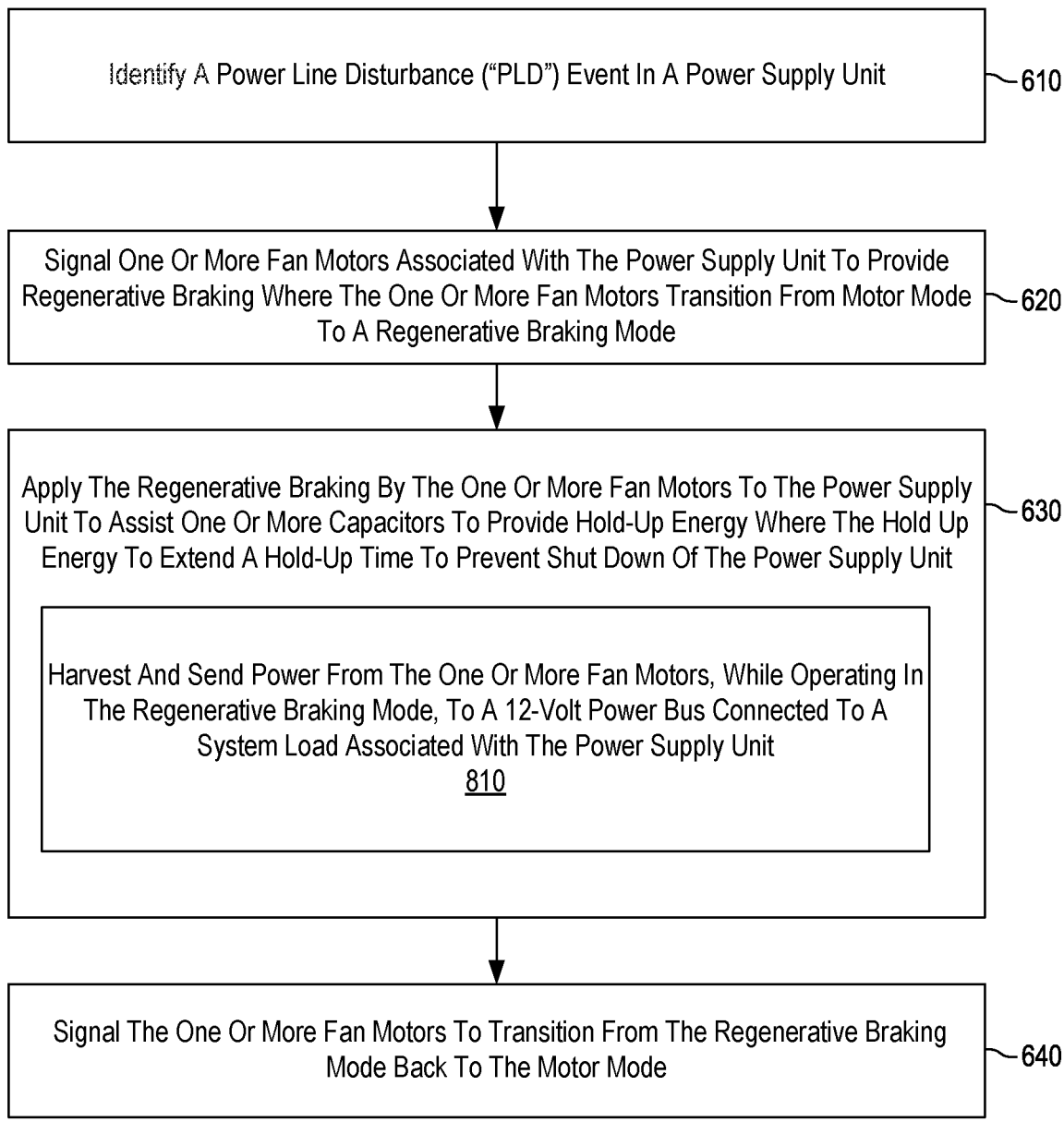
FIG. 8 is a flowchart of an example method for increasing power supply hold-up time using regenerative braking according to some implementations of the present disclosure.

For further explanation, FIG. 8 is a flowchart of an example method for increasing power supply hold-up time using regenerative braking according to some implementations of the present disclosure. Like the example method of FIG. 6, the example method of FIG. 8 includes identifying 610 a power line disturbance (PLD) event in a power supply units; signaling 620 one or more fan motors associated with the power supply unit to provide regenerative braking where the one or more fan motors transition from motor mode to a regenerative braking mode; applying 630 the regenerative braking by the one or more fan motors to the power supply unit to assist one or more capacitors to provide hold-up energy where the hold-up energy to extend a hold-up time to prevent shut down of the power supply unit; and signaling 640 the one or more fan motors to transition from the regenerative braking mode back to the motor mode.

The example method of FIG. 8 also includes harvest 810 and send power from the one or more fan motors, while operating in the regenerative braking mode, to a 12-volt power bus connected to a system load associated with the power supply unit. Collecting and sending power from the one or more fan motors, while operating in the regenerative braking mode, may include harvesting the rotational inertia of the fan rotors of the fan 520 as they are slowed down and turned off. The harvested energy is transferred from the fan motor to a power bus and the bulk capacitors to increase the hold-up time to prevent shut down of the power supply unit.

The present disclosure may be a system, a method, or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and a wireless network. The network may comprise copper transmission cables, optical transmission fibers, wireless transmission, routers, firewalls, switches, gateway computers and edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and block diagrams of methods, apparatus (systems), and computer program products according to embodiments of the disclosure. It will be understood that each block of the flowchart illustrations and block diagrams, and combinations of blocks in the flowchart illustrations and block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and block diagram block or blocks. These computer readable program instructions may also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowcharts and block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowcharts and block diagram block or blocks.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and flowchart illustrations, and combinations of blocks in the block diagrams and flowchart illustrations, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for increasing power supply hold-up time in a computing system, the method comprising:
   identifying a power line disturbance ("PLD") event in a power supply unit;
   signaling one or more fan motors associated with the power supply unit to provide regenerative braking based on identifying the PLD event, wherein the one or more fan motors transition from a motor operating mode to a regenerative braking mode; and
   applying the regenerative braking to the one or more fan motors associated with the power supply unit, wherein a hold-up time is extended to prevent shut down of the power supply unit.

2. The method of claim 1, wherein identifying the PLD event further includes detecting a current signal is less than a power supply unit shutdown threshold.

3. The method of claim 1, further including determining a number of the one or more fan motors to transition from the motor operating mode to the regenerative braking mode based on load requirements for the power supply unit, and wherein at least one of the one or more fan motors is included within the computing system.

4. The method of claim 1, wherein applying the regenerative braking by the one or more fan motors to the power supply unit further includes applying the regenerative braking by the one or more fan motors in conjunction with one or more capacitors of the power supply unit to provide hold-up energy to extend the hold-up time to prevent shut down.

5. The method of claim 1, further including sending power collected from the one or more fan motors, while operating in the regenerative braking mode, to a 12-volt power bus connected to a system load associated with the power supply unit.

6. The method of claim 1, further including detecting an alternating current signal is greater than a power supply unit shutdown threshold while applying the regenerative braking by the one or more fan motors to the power supply unit.

7. The method of claim 1, further including signaling the one or more fan motors to transition from the regenerative braking mode back to the motor operating mode, and wherein at least one of the one or more fan motors is included within the power supply unit.

8. A system for increasing power supply hold-up time in a computing system, comprising one or more computers with executable instructions that when executing cause the system to:
identify a power line disturbance ("PLD") event in a power supply unit;
signal one or more fan motors associated with the power supply unit to provide regenerative braking based on identifying the PLD event, wherein the one or more fan motors transition from a motor operating mode to a regenerative braking mode; and
apply the regenerative braking to the one or more fan motors associated with the power supply unit, wherein a hold-up time is extended to prevent shut down of the power supply unit.

9. The system of claim 8, wherein identifying the PLD event further includes detecting a current signal is less than a power supply unit shutdown threshold.

10. The system of claim 8, wherein the executable instructions that when executed cause the system to determine a number of the one or more fan motors to transition from the motor operating mode to the regenerative braking mode based on load requirements for the power supply unit.

11. The system of claim 8, wherein applying the regenerative braking by the one or more fan motors to the power supply unit further includes applying the regenerative braking by the one or more fan motors in conjunction with one or more capacitors of the power supply unit to provide hold-up energy to extend the hold-up time to prevent shut down.

12. The system of claim 8, wherein the executable instructions that when executed cause the system to send power collected from the one or more fan motors, while operating in the regenerative braking mode, to a 12-volt power bus connected to a system load associated with the power supply unit.

13. The system of claim 8, wherein the executable instructions that when executed cause the system to detect an alternating current signal is greater than a power supply unit shutdown threshold while applying the regenerative braking by the one or more fan motors to the power supply unit.

14. The system of claim 8, wherein the executable instructions that when executed cause the system to signal the one or more fan motors to transition from the regenerative braking mode back to the motor operating mode.

15. A computer program product for increasing power supply hold-up time in a computing system, the computer program product comprising a non-transitory computer readable storage medium with computer program instructions stored thereon that, when executed, cause a computer to carry out the steps of:
collecting data relating to one or more circuit paths during a design stage of a processor to identify a power line disturbance ("PLD") event in a power supply unit;
signaling one or more fan motors associated with the power supply unit to provide regenerative braking based on identifying the PLD event, wherein the one or more fan motors transition from a motor operating mode to a regenerative braking mode; and
applying the regenerative braking to the one or more fan motors associated with the power supply unit, wherein a hold-up time is extended to prevent shut down of the power supply unit.

16. The computer program product of claim 15, wherein identifying the PLD event further includes detecting a current signal is less than a power supply unit shutdown threshold.

17. The computer program product of claim 15, wherein the steps further comprise: determining a number of the one or more fan motors to transition from the motor operating mode to the regenerative braking mode based on load requirements for the power supply unit.

18. The computer program product of claim 15, wherein applying the regenerative braking by the one or more fan motors to the power supply unit further includes applying the regenerative braking by the one or more fan motors in conjunction with one or more capacitors of the power supply unit to provide hold-up energy to extend the hold-up time to prevent shut down.

19. The computer program product of claim 15, wherein the steps further comprise: sending power collected from the one or more fan motors, while operating in the regenerative braking mode, to a 12-volt power bus connected to a system load associated with the power supply unit.

20. The computer program product of claim 15, wherein the steps further comprise:
detecting an alternating current signal is greater than a power supply unit shutdown threshold while applying the regenerative braking by the one or more fan motors to the power supply unit; and
signaling the one or more fan motors to transition from the regenerative braking mode back to the motor operating mode.

* * * * *